US009204767B2

(12) United States Patent
Ciavarella et al.

(10) Patent No.: US 9,204,767 B2
(45) Date of Patent: Dec. 8, 2015

(54) PULL PUMPS, REFILL UNITS AND DISPENSERS FOR PULL PUMPS

(71) Applicant: GOJO Industries, Inc., Akron, OH (US)

(72) Inventors: Nick Ciavarella, Seven Hills, OH (US); Jon Fawcett, Stow, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 14/450,623

(22) Filed: Aug. 4, 2014

(65) Prior Publication Data

US 2014/0367420 A1 Dec. 18, 2014

Related U.S. Application Data

(62) Division of application No. 13/747,881, filed on Jan. 23, 2013, now Pat. No. 8,827,119.

(51) Int. Cl.

| | |
|---|---|
| ***B65D 88/54*** | (2006.01) |
| ***G01F 11/00*** | (2006.01) |
| ***A47K 5/16*** | (2006.01) |
| ***B65D 83/00*** | (2006.01) |
| ***A47K 5/12*** | (2006.01) |
| ***A47K 5/14*** | (2006.01) |
| ***B05B 11/00*** | (2006.01) |
| *B05B 9/08* | (2006.01) |

(52) U.S. Cl.

CPC ................. *A47K 5/16* (2013.01); *A47K 5/1207* (2013.01); *A47K 5/14* (2013.01); *B05B 11/3023* (2013.01); *B65D 83/00* (2013.01); *B05B 9/0861* (2013.01)

(58) Field of Classification Search

CPC ...... B65D 83/00; B65D 83/0005; A47K 5/14; A47K 5/16; A47K 5/1211; A47K 5/1212; B05B 11/3023; B05B 9/0861

USPC ........... 222/190, 321.9, 335, 372, 380, 383.1, 222/384, 386, 387, 390

See application file for complete search history.

(56) References Cited

U.S. PATENT DOCUMENTS

| | | | | |
|---|---|---|---|---|
| 3,844,452 | A * | 10/1974 | Blum | 222/321.7 |
| 4,479,593 | A | 10/1984 | Bundschuh | |
| 5,282,552 | A | 2/1994 | Ophardt | |
| 5,445,288 | A * | 8/1995 | Banks | 222/95 |
| 5,725,131 | A * | 3/1998 | Bell et al. | 222/196 |
| 5,975,360 | A * | 11/1999 | Ophardt | 222/83 |
| 6,082,586 | A | 7/2000 | Banks | |
| 6,557,736 | B1 * | 5/2003 | Ophardt | 222/321.9 |

(Continued)

*Primary Examiner* — J. Casimer Jacyna
*Assistant Examiner* — Benjamin R Shaw
(74) *Attorney, Agent, or Firm* — Calfee, Halter & Griswold LLP

(57) ABSTRACT

Dispensers, refill units and pumps are disclosed herein. An exemplary refill unit for dispensers includes a container with a cap secured thereto. A piston shaft having a piston is located through an aperture in the cap. A pump chamber is located within the neck of the container. The piston is movable at least partially within the pump chamber. When the piston is located in the neck of the container, the piston creates a seal with the neck. The piston is movable within the container between a first position creating a seal with the neck of the container and a second position wherein the seal with the container is broken to allow liquid to flow into the pump chamber. The pump chamber includes an outlet. Movement of the piston in a first direction compresses the pump chamber and movement of the piston in a second direction expands the pump chamber.

17 Claims, 4 Drawing Sheets

(56) References Cited

U.S. PATENT DOCUMENTS

| | | | | |
|---|---|---|---|---|
| 6,655,556 | B1 * | 12/2003 | Bonningue | 222/386 |
| 7,708,166 | B2 | 5/2010 | Ophardt | |
| 8,047,403 | B2 | 11/2011 | Quinlan et al. | |
| 8,365,965 | B2 | 2/2013 | Ophardt | |
| 2002/0158085 | A1 * | 10/2002 | Ophardt et al. | 222/383.1 |
| 2007/0284394 | A1 | 12/2007 | Ophardt | |
| 2009/0116986 | A1 * | 5/2009 | Lishanski et al. | 417/491 |
| 2012/0074171 | A1 | 3/2012 | Quinlan et al. | |
| 2012/0097704 | A1 * | 4/2012 | Johnson et al. | 222/79 |
| 2012/0104048 | A1 | 5/2012 | Tseng | |
| 2012/0160879 | A1 | 6/2012 | Ciavarella et al. | |
| 2013/0094983 | A1 | 4/2013 | Pelfrey | |

* cited by examiner

PULL PUMPS, REFILL UNITS AND DISPENSERS FOR PULL PUMPS

TECHNICAL FIELD

The present invention relates generally to pumps, refill units for dispensers, and dispensers, and more particularly to pull pumps, refill units and dispensers that utilize pull pumps.

BACKGROUND OF THE INVENTION

Liquid dispenser systems, such as liquid soap and sanitizer dispensers, provide a user with a predetermined amount of liquid upon actuation of the dispenser. In addition, it is sometimes desirable to dispense the liquid in the form of foam by, for example, injecting air into the liquid to create a foamy mixture of liquid and air bubbles. Many dispensers are refillable with refill units that comprise a pump (or a pump and an air compressor) and a container. Many of the refill units currently on the market are inverted. Many of the inverted refill units that have pumps dispense when the piston moves upward.

SUMMARY

Dispensers, refill units and pumps are disclosed herein. The refill units include a container secured to a pump. Some exemplary refill units for dispensers include a container for holding a liquid and a post seal pump. The post seal pump includes a housing secured to the container. A post having a post seal is secured to the housing. In addition, the housing includes a pump chamber. A base is located at one end of the pump chamber. The base includes an aperture. A shaft seal is secured to the housing and located proximate the aperture in the base. A hollow piston shaft is included and has a first end that fits over the post and engages the post seal and a lower portion that reciprocates up and down through the aperture in the base. A second end of the hollow piston shaft provides a fluid outlet. A piston is located at an intermediary position on the shaft. In addition, there are one or more apertures through the piston shaft located between the piston and the second end of the hollow piston shaft. When the piston shaft is in a first position, fluid flows into the pump chamber and the one or more apertures through the piston shaft are sealed off by the post seal. When the piston shaft is in a second position, the piston engages a wall of the pump chamber and the one or more apertures are away from the post seal to provide a fluid path from the pump chamber to the interior of the hollow piston shaft.

Another exemplary refill unit for a liquid dispenser includes a container for holding a liquid and a pump secured to the container. The pump includes a pump chamber and a stationary sealing member. A hollow piston shaft having a first end and a second end is also included. The first end of the hollow piston fits over the stationary sealing member. The hollow piston shaft is movable in a reciprocating motion over the stationary sealing member. A piston extends outward from the hollow piston shaft. In addition, one or more apertures through the hollow piston shaft are located between the piston and the second end of the hollow piston shaft. During operation, fluid flows into the pump chamber when the one or more apertures through the piston shaft are sealed off by the post seal; and when the piston engages a wall of the pump chamber, the one or more apertures provide a fluid path from the pump chamber to the second end of the hollow piston shaft.

Another exemplary refill unit for a dispenser includes a container for holding a liquid. The container includes a neck. A cap is secured to the neck. A piston shaft is located through an aperture in the cap. The piston shaft includes piston. A pump chamber is located at least partially within the neck of the container. The piston is movable at least partially within the pump chamber. When the piston is located in the neck of the container, the piston creates a seal with the neck of the container. The piston is movable within the container between a first position creating a seal with the neck of the container and a second position wherein the seal with the container is broken to allow liquid to flow into the pump chamber. The pump chamber includes an outlet. Movement of the piston in a first direction compresses the pump chamber and movement of the piston in a second direction expands the pump chamber. A seal is located proximate the aperture for creating a liquid tight seal between the piston shaft and the cap.

An exemplary refill unit for a dispenser includes a container for holding a liquid. The container includes a neck. A cap is secured to the neck. A piston shaft having a piston and a drive portion is also included. A pump chamber is located at least partially within the neck. The piston is movable between a first position sealing off the pump chamber from the container and a second position opening a passage between the container and the pump chamber to allow liquid to flow into the pump chamber. The pump chamber includes an outlet. Movement of the piston in a first direction compresses the pump chamber and movement of the piston in a second direction expands the pump chamber. The cap includes an aperture and the piston shaft extends through the aperture. A seal for creating a liquid-tight seal between the piston shaft and the cap.

Another exemplary refill unit for a dispenser includes a container for holding a liquid. The container includes a neck and a cap secured to the neck. A piston shaft having a piston and a drive portion is also provided. A pump chamber is formed by the container neck, the cap and the piston. The pump chamber includes an outlet. Movement of the piston in a first direction seals off the pump chamber and further movement reduces the volume of the pump chamber and movement of the piston in a second direction expands the volume of the pump chamber and further movement in the second direction opens the pump chamber allowing fluid to flow into the pump chamber. An aperture in the cap is included and the piston shaft extends through the aperture. In addition, a seal for creating a liquid-tight seal between the piston shaft and the cap is also included.

BRIEF DESCRIPTION OF THE DRAWINGS

These and other features and advantages of the present invention will become better understood with regard to the following description and accompanying drawings in which.

DETAILED DESCRIPTION

Figure 1:
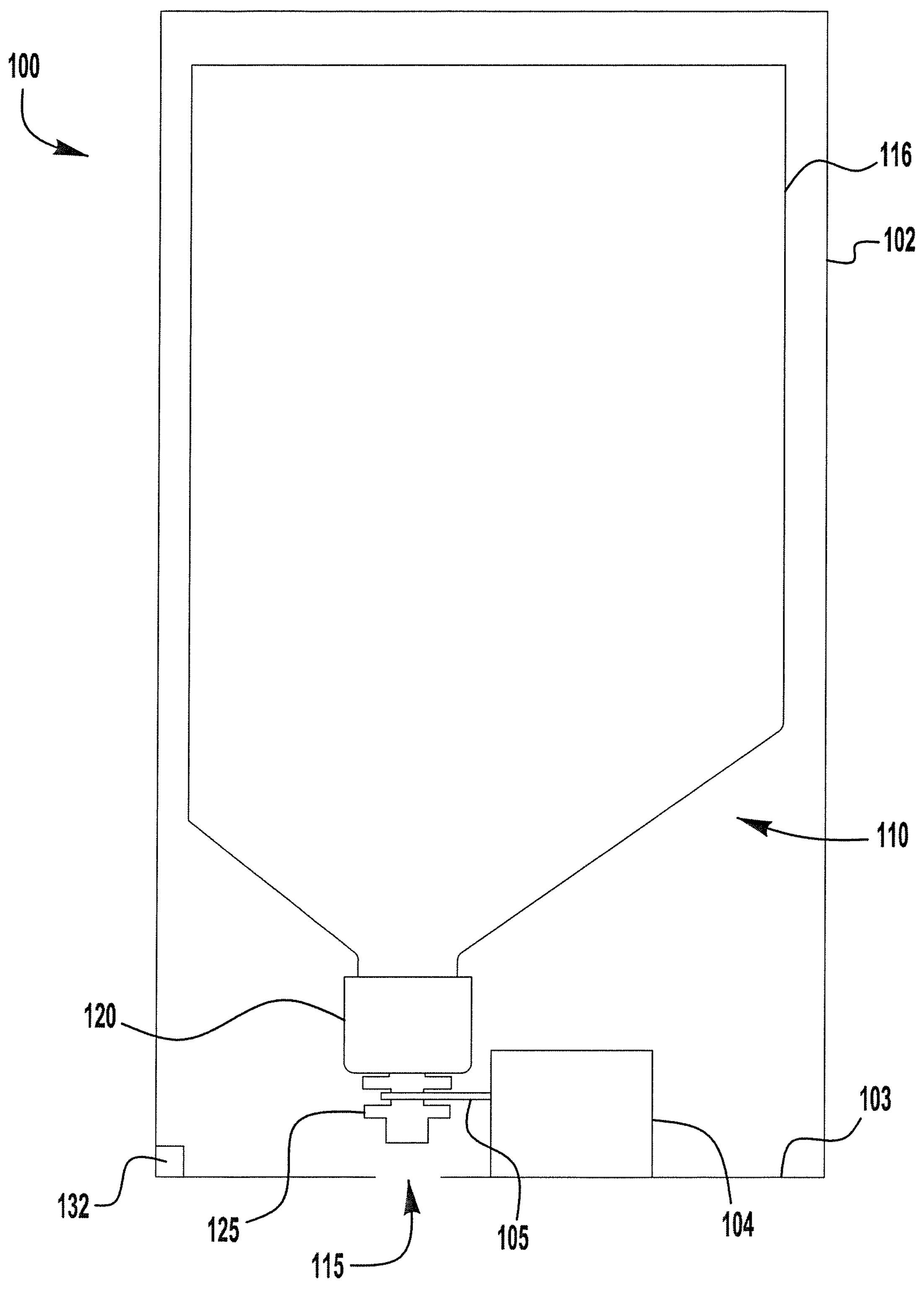
FIG. 1 is a cross-section of an exemplary liquid dispenser having a refill unit with a pull pump.

FIG. 1 illustrates an exemplary embodiment of a dispenser 100. The cross-section of FIG. 1 is taken through the housing 102 to show the pump 120 and container 116. Dispenser 100 includes a disposable refill unit 110. The disposable refill unit 110 includes a container 116 connected to pump 120. The dispenser 100 may be a wall-mounted system, a counter-mounted system, an un-mounted portable system movable from place to place or any other kind of liquid dispenser system. Dispenser 100 may also be a foam dispenser. In such a case, dispenser 100 would also include an air compressor (not shown), either as part of the refill unit 110 or as part of the dispenser and in fluid communication with an air inlet of a refill unit to provide air to the refill unit to mix with the liquid to form a foam. Some of the exemplary embodiments described herein have foam pumps, that is they contain a liquid pump and an air compressor; however, the inventive venting system described herein works equally well with a liquid pump that does not include an air compressor, and the air compressors are not illustrated herein for clarity.

Exemplary embodiments of compressors, compressor portions and mixing chambers may be found in co-pending applications: Ser. No. 61/692,290 filed on Aug. 23, 2012, titled Horizontal Pumps, Refill Units and Foam Dispenser with Integral Air Compressors; Ser. No. 61/695,140 filed on Aug. 30, 2012, titled Horizontal Pumps, Refill Units and Foam Dispensers; Ser. No. 13/208,076 filed on Aug. 11, 2011, titled Split Body Pumps for Foam Dispensers and Refill Units; Ser. No. 13/484,988 filed on May 31, 2012, titled Modular Pump; and Ser. No. 13/465,352 filed on May 7, 2012, titled Foam Pump, each of which is incorporated herein by reference in its entirety. The liquid pumps and liquid pump portions disclosed herein may be integrated with the mixing chamber and air compressor components shown and described in the incorporated references.

The container 116 forms a liquid reservoir that contains a supply of a liquid within the disposable refill unit 110. In various embodiments, the contained liquid could be, for example, a soap, a sanitizer, a cleanser, a disinfectant or some other liquid that may be foamable or not foamable (in the case of a liquid only pump). In the exemplary disposable refill unit 110, the container 116 is a collapsible container and can be made of thin plastic or like material. In other embodiments, the container 116 may be formed by a non-collapsible housing member, or have any other suitable configuration for containing the liquid without leaking. In some embodiments, the container is non-collapsible and a vent (not shown) is used to allow air to enter container 116 when liquid is pumped out of container 116. In some embodiments, the pump vents the bottle during operation. The container 116 may advantageously be refillable, replaceable or both refillable and replaceable.

In the event the liquid stored in the container 116 of the installed disposable refill unit 110 runs out, or the installed refill unit 110 otherwise has a failure, the installed refill unit 110 may be removed from the foam dispenser 100. The empty or failed disposable refill unit 110 may then be replaced with a new disposable refill unit 110.

The housing 102 of the dispenser 100 contains one or more actuating members 104 to activate the pump 120. As used herein, actuator or actuating members or mechanisms include one or more parts that cause the dispenser 100 to move liquid, air or foam. Actuator 104 is generically illustrated because there are many different kinds of pump actuators which may be employed in the foam dispenser 100. The actuator 104 of the foam dispenser 100 may be any type of actuator such as, for example, a manual lever, a manual pull bar, a manual push bar, a manual rotatable crank, an electrically activated actuator or other means for actuating the pump 120. Electronic actuators may additionally include a sensor 132 for detecting the presence of an object and to provide for a hands-free dispenser system with touchless operation. Various intermediate linkages, such as for example linkage 105, connect the actuator member 104 to the pump 120 within the system housing 102. An aperture 115 is located in bottom plate 103 of housing 102 and allows liquid dispensed from the nozzle 125 of pump 120 to be dispensed to a user.

Figure 2:
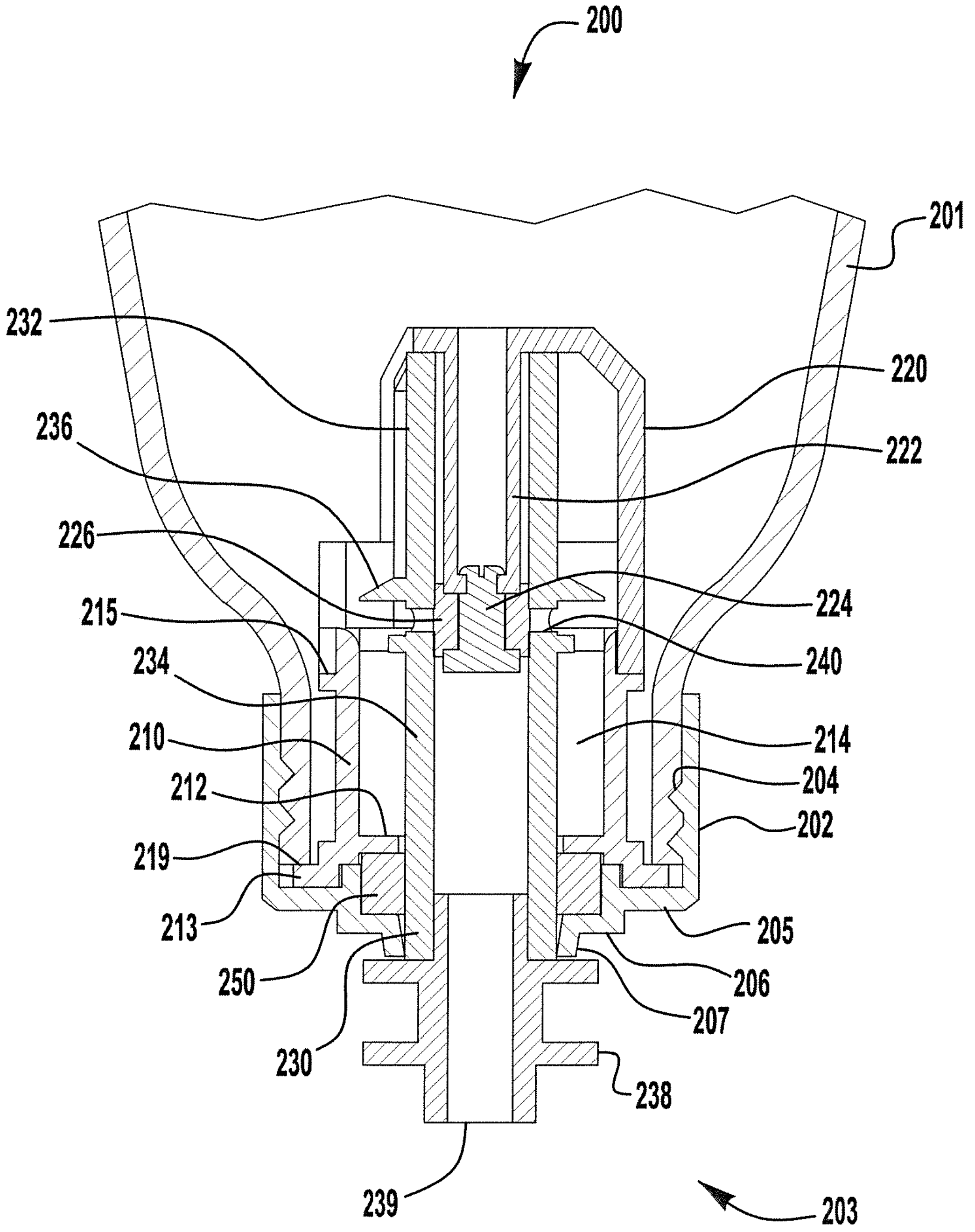
FIGS. 2 and 3 are cross-sections of an exemplary refill unit with a pull pump.

FIG. 2 is a cross-sectional view of an exemplary embodiment of a refill unit 200 suitable for use in dispensers. Refill unit 200 includes a container 201 secured to a cap 202 of a liquid pump 203. Cap 202 is secured to the neck of container 201 with one or more threads 204. Cap 202 may be secured to container 201 by any means, such as, for example, a snap-fit connection, an adhesive connection, a friction-fit connection, welding or the like. Cap 202 includes a base 205, a lower seal support 206 and an annular projection 207 that guides piston shaft 230.

A housing member 210 is located within cap 202. Housing member 210 forms a substantially cylindrical pump chamber 214 and includes an outwardly extending annular projection 213. Annular projection 213 rests on base 205 of cap 202. When the pump 203 is connected to container 201, the top 219 of the container neck and base 205 of cap 202 secures housing member 210 in place between them. Housing member 210 also includes an inwardly extending annular upper seal support 212. A shaft seal 250 is held in place by lower seal support 206 and upper seal support 212. The shaft seal 250 creates a seal between the pump chamber 214 and piston shaft 230. In addition, housing member 210 includes a second outwardly extending projection member 215. Second outwardly extending projection member 215 supports a post cage 220.

Post cage 220 includes one or more supports to support a post 222. In some embodiments, post cage 220 is made integrally with housing member 210. Located at one end of the post 222 is a post seal 226. Post seal 226 is secured to plug 224 which is secured to post 222; however, in some embodiments, post seal 226 is secured directly to post 222. Post seal 226 may be secured to post 222 by having a recess in post 222, by adhesive, by friction fit or the like.

Piston shaft 230 is hollow and includes a first end 232 that fits over post 222 and post seal 226. As piston shaft 230 moves up and down, the first end 232 remains over post 222, and post 222 serves as a guide to prevent or reduce lateral movement of the piston shaft 230 as the piston shaft 230 moves up and down. Liquid outlet 239 is located at the second end 234 of piston shaft 230. Also located near the second end of piston shaft 230 are one or more projections 238 that engage with an actuator (not shown) to move the piston shaft 230 up and down. A piston 236 extends outward from the piston shaft 230. In addition, one or more apertures 240 through the piston shaft 230 are located between the piston 236 and outlet 239.

Shaft seal 250 may be any type of sealing member. In one embodiment, shaft seal 250 is made of foam. An advantage of a foam shaft seal 250 is that a foam seal has very little friction against piston shaft 230. Thus, less energy is required to move the piston shaft 230. Similarly, post seal 226 may be any type of sealing member. In one embodiment, post seal 236 is made of foam.

Figure 3:
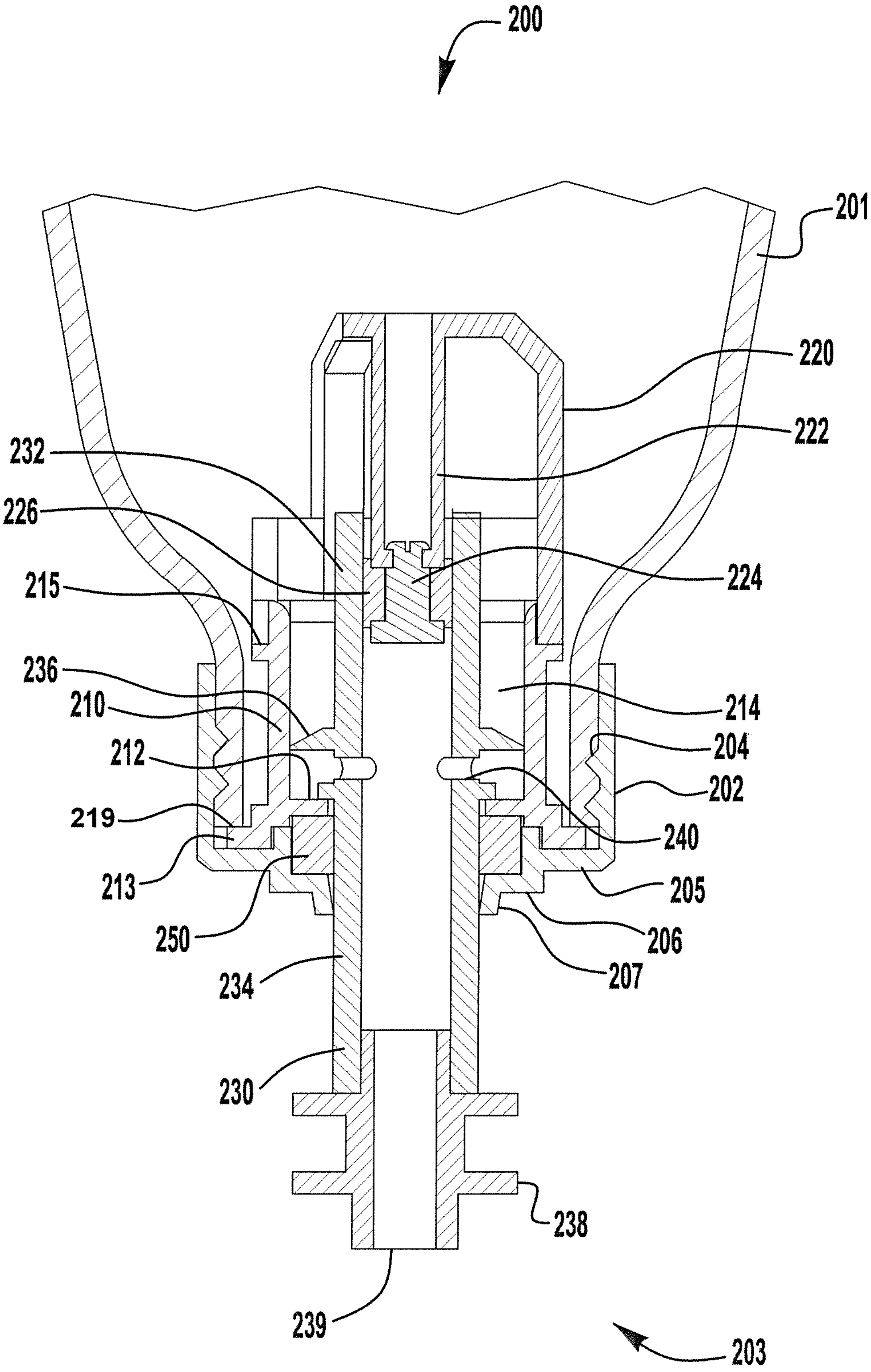

FIG. 2 illustrates pump 203 in a primed or priming position, and FIG. 3 illustrates pump 203 in a discharging or discharged position. Pump 203 is a gravity fed pump. Accordingly, while the piston shaft 230 is in the position illustrated in FIG. 2, liquid in container 201 flows into pump chamber 214. Post seal 226 seals the one or more apertures 240 of piston shaft 230 thereby preventing liquid from flowing into the interior of piston shaft 230 and out of the outlet 239.

As piston shaft 230 is moved downward toward its discharged position by an actuator (not shown), piston 236 contacts the wall of pump chamber 214 and seals pump chamber

214 off from the interior of container 201. In addition, apertures 240 move off of post seal 226 placing the pump chamber 214 in fluid communication with the interior of piston shaft 230. Continued movement of piston shaft 230 downward reduces the volume of pump chamber 214 and forces the fluid to flow through the one or more apertures 240 into the interior of pump shaft 230 and out of outlet 239.

When piston shaft 230 is moved upward toward its charged or charging position, pump chamber 214 begins to expand. Because piston 236 maintains contact with the wall of pump chamber 214, air and any residual liquid in the interior of piston shaft 230 are sucked back through the one or more apertures 240 into pump chamber 214. This “suck-back” feature prevents fluid from dripping out of outlet 239 after a user moves her hands away from the outlet 239. Once piston 236 moves above the wall of pump chamber 214, the one or more apertures 240 are sealed off by post seal 226 and fluid is prevented from flowing through the apertures 240. Air that entered pump chamber 214 during movement of the piston shaft 230 to its recharging position flows up into container 201 and liquid from container 201 flows into pump chamber 214 and the pump 203 is primed and ready to provide another dose of fluid to a user. In some embodiments, the flow of the air from pump chamber 214 into container 201 vents the container 201

In addition, although the pump 203 has been described as being made of selected sub-parts, pump 203, as well as the other embodiments of pumps disclosed herein, may be made from more sub-parts or fewer sub-parts.

Figure 4:
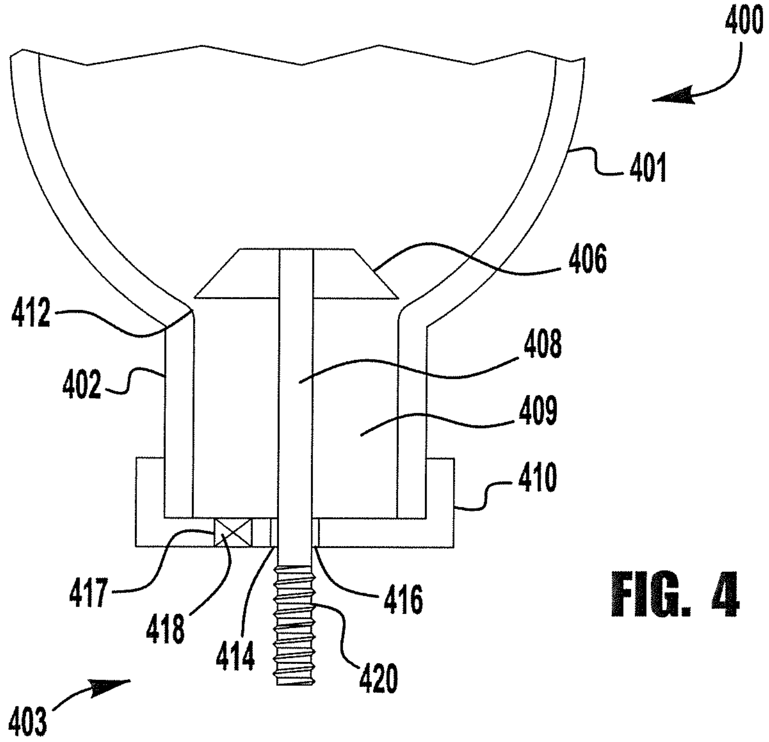
FIGS. 4 and 5 are cross-sections of another exemplary refill unit with a pull pump.

FIG. 4 illustrates another exemplary embodiment of a refill unit 400 having a container 401 and pull-pump 403. Container 401 includes a neck 402. Pull-pump 403 includes a piston 406 secured to a piston shaft 408. A pump chamber 409 is located at least partially within neck 402 of container 401 and is formed at least in part by piston 406. Container 401 transitions into neck 402 at a rounded wall 412. In some embodiments, pump 403 includes a sleeve (not shown) that fits within neck 402. A sleeve may be particularly useful if the container is formed, by for example, blow molding and the neck does not form a satisfactory seal with the piston.

As illustrated in FIG. 4, when piston 406 is located above rounded wall 412, fluid may flow into pump chamber 409 from container 401 and any air in pump chamber 409 may flow up into container 401 to vent container 401. Accordingly, FIG. 4 illustrates a priming or primed position.

A cap 410 is secured to the neck 402 of container 401. Cap 410 may be connected to neck 402 by any means such as, for example, a threaded connection, an adhesive connection, a press-fit connection, a welded connection or the like. Cap 410 includes an aperture 414 through its center to receive piston shaft 408. A sealing member 416 is secured to cap 410 and forms a seal between pump chamber 409 and piston shaft 408 to prevent liquid from leaking out of pump chamber 409 past shaft 408. Sealing member 416 may be any type of sealing member such as, for example, a foam seal, a wiper seal, one or more o-rings or the like.

In addition, in some embodiments, cap 410 includes an outlet aperture 417 that contains a one-way outlet valve 418. One-way outlet valve 418 may be any type of one-way outlet valve, such as, for example, a spring-and-ball valve, a flapper valve, a poppet valve, an umbrella valve, a slit vale, or the like. One-way outlet valve 418 has a cracking pressure that is high enough to prevent liquid in pump chamber 409 from leaking out while the piston 406 is located above rounded wall 412 and pump chamber 409 is filling. Thus, when piston 406 moves down wall 412, air flows into the container 401 to vent container 401.

In some embodiments, container 401 may be a collapsible container that would not require venting. Preferably, however, an air vent (not shown) may be located in container 401 to vent the container. In some embodiments, cap 410 includes an aperture and one-way air inlet and check valve (not shown) which opens to allow air into the pump chamber 409. The one-way air inlet may be any one-way valve that will permit air to enter the pump chamber 409 during upward movement of piston 406.

Figure 5:
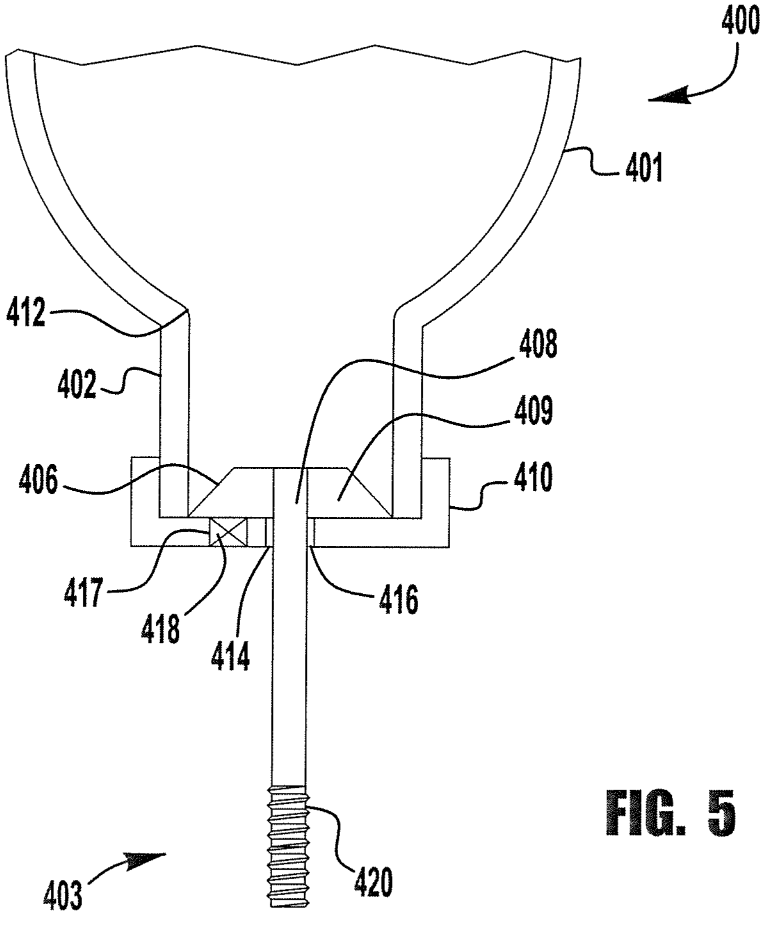

Piston shaft 408 includes a drive portion 420. In some embodiments, drive portion 420 has threads and mates with a screw drive (not shown) on a dispenser (not shown). Accordingly, as the screw drive on the dispenser (not shown) rotates in a first direction, piston 406 moves downward reducing the volume of pump chamber 409 and forcing the liquid out of one-way outlet valve 418. As the screw drive on the dispenser rotates in a second direction, piston 406 moves upward. Once piston 406 moves above the rounded wall portion 412, fluid may flow into pump chamber 409. FIG. 5 illustrates pump 403 in its fully discharged position, or at its end of stroke position.

In some embodiments, piston shaft 408 and the drive mechanism have a rack and pinion relationship, and in one embodiment the rack is secured to, or made integrally with the piston shaft. In some embodiments, the drive is a worm drive and the piston shaft includes mating threads. In some embodiments, cap 410 includes threads and piston shaft 408 has matching threads. A motor connected to shaft 408 rotates shaft 408 to move the piston shaft 408 up and down. In such an embodiment, the motor may float up and down with the piston shaft.

In an alternative embodiment, piston shaft 408 has a hollow interior and includes an aperture (not shown) to allow fluid from the pump chamber 409 to flow through the aperture and into the center of the piston shaft 408 and out through the end of piston shaft 408. In such an embodiment, a one-way outlet valve may be included and may be located at least partially within, or near, the end of piston shaft 408.

Pump 403 is a variable dose pump. Piston 406 may be moved its entire dispense stroke and dispense a full dose, or be moved a fraction of the dispense stroke and dispense a partial dose.

Although the embodiments described herein are liquid pumps, the pumps may be used as foam pumps. To utilize the pumps as foam pumps, a mixing chamber (not shown) is included near the outlet of the liquid pumps. The mixing chamber has a liquid inlet for receiving the liquid and an air inlet for receiving air. An compressor (not shown) is in fluid communication with the mixing chamber and directs pressurized air into the mixing chamber to mix with liquid from the liquid pump. The air and liquid mixture is forced out of an outlet in the form of a foam. A mix media may be located in fluid communication with the outlet of the mixing chamber to further cause the mixture to form a rich foam. The mix media (not shown) may be, for example, one or more screens, a porous member, baffles or the like.

While the present invention has been illustrated by the description of embodiments thereof and while the embodiments have been described in considerable detail, it is not the intention of the applicants to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus and illustrative examples shown and described. Accordingly, departures may be made from such details without departing from the spirit or scope of the applicants' general inventive concept.

We claim:

1. A refill unit for a dispenser comprising:
a container for holding a liquid;
the container having a neck;
a cap secured to the neck;
a piston shaft having a piston;
a pump chamber located at least partially within the neck;
the piston movable at least partially within the pump chamber;
an aperture in the cap wherein the piston shaft extends through the aperture; and
a seal for creating a liquid-tight seal between the piston shaft and the cap;
wherein when the piston is located in the neck of the container, the piston seals the pump chamber off from the container;
the piston movable within the container between a first position sealing off the pump chamber from the container and a second position opening a passage between the container and the pump chamber to allow liquid to flow into the pump chamber;
the pump chamber having an outlet through the cap; and
an outlet valve in the cap;
wherein movement of the piston in a first direction compresses the pump chamber and movement of the piston in a second direction expands the pump chamber.

2. The refill unit of claim 1 wherein the piston shaft comprises a threaded portion for moving the piston up and down.

3. The refill unit of claim 1 wherein the piston shaft comprises a tooth portion for engaging a screw drive.

4. The refill unit of claim 1 wherein the piston shaft comprises a hollow center and the pump chamber outlet is an aperture located through the wall of the piston shaft that allows liquid to flow into the hollow center and the refill unit includes an outlet valve in fluid communication with the hollow center of the piston shaft.

5. The refill unit of claim 1 further comprising a mixing chamber and an air compressor wherein the mixing chamber includes an air inlet and is located downstream of the pump chamber outlet and the air compressor is secured to the cap and in fluid communication with the air inlet to the mixing chamber.

6. A refill unit for a dispenser comprising:
a container for holding a liquid;
the container having a neck;
a cap secured to the neck;
one-way outlet valve in the cap;
a piston shaft having a piston and a drive portion;
a pump chamber located at least partially within the neck;
the piston movable between a first position sealing off the pump chamber from the container and a second position opening a passage between the container and the pump chamber to allow liquid to flow into the pump chamber;
the pump chamber having an outlet;
wherein movement of the piston in a first direction compresses the pump chamber and movement of the piston in a second direction expands the pump chamber;
an aperture in the cap wherein the piston shaft extends through the aperture; and
a seal for creating a liquid-tight seal between the piston shaft and the cap.

7. The refill unit of claim 6 wherein the drive portion of the piston shaft is located outside of the pump chamber.

8. The refill unit of claim 7 wherein the drive portion comprises threads.

9. The refill unit of claim 6 wherein the piston forms a seal against an inside wall of the neck of the container.

10. The refill unit of claim 6 further comprising an aperture in the piston shaft that allows fluid to flow from the pump chamber into the center of the piston shaft and out of the end of the piston shaft.

11. The refill unit of claim 6 wherein the piston shaft rotates.

12. The refill unit of claim 6 wherein fluid flows into the pump chamber due to gravity.

13. A refill unit for a dispenser comprising:
a container for holding a liquid;
the container having a neck;
a cap;
one-way outlet valve in the cap;
a piston shaft having a piston and a drive portion;
a pump chamber formed by the container neck, the cap and the piston;
the pump chamber having an outlet;
wherein movement of the piston in a first direction seals off the pump chamber and further movement reduces the volume of the pump chamber and movement of the piston in a second direction expands the volume of the pump chamber and further movement in the second direction opens the pump chamber allowing fluid to flow into the pump chamber;
an aperture in the cap wherein the piston shaft extends through the aperture; and
a seal for creating a liquid-tight seal between the piston shaft and the cap.

14. The refill unit of claim 13 wherein the drive portion of the piston shaft is located outside of the pump chamber.

15. The refill unit of claim 14 wherein the drive portion comprises threads.

16. The refill unit of claim 13 further comprising an aperture in the piston shaft that allows fluid to flow from the pump chamber into the center of the piston shaft and out of the end of the piston shaft.

17. The refill unit of claim 13 wherein fluid flows into the pump chamber due to gravity.

* * * * *